(12) United States Patent
Bounds

(10) Patent No.: US 10,632,806 B2
(45) Date of Patent: Apr. 28, 2020

(54) SYSTEM AND METHOD FOR IMPROVING STRUCTURAL WEAR ON A MOTOR VEHICLE

(71) Applicant: Arrow Ford, Inc., Abilene, TX (US)

(72) Inventor: Clayton Paul Bounds, Abilene, TX (US)

(73) Assignee: Arrow Ford, Inc., Abilene, TX (US)

( * ) Notice: Subject to any disclaimer, the term of this patent is extended or adjusted under 35 U.S.C. 154(b) by 32 days.

(21) Appl. No.: 15/802,562

(22) Filed: Nov. 3, 2017

(65) Prior Publication Data
US 2019/0135064 A1    May 9, 2019

(51) Int. Cl.
*B60G 3/26*     (2006.01)
*B60G 7/00*     (2006.01)

(52) U.S. Cl.
CPC ............ *B60G 3/26* (2013.01); *B60G 7/001* (2013.01); *B60G 2200/44* (2013.01); *B60G 2200/46* (2013.01)

(58) Field of Classification Search
CPC ........ B60G 2206/8103; B60G 2200/44; B60G 2200/46; B60G 3/06; B60G 3/26; B60G 7/001; B60G 7/003; B60G 7/02; B60Y 2200/43; B21D 7/00; B21D 11/00; B62D 7/06; B62D 7/08; B62D 7/09; B62D 7/20; B62D 17/00
See application file for complete search history.

(56) References Cited

U.S. PATENT DOCUMENTS

| | | | | | |
|---|---|---|---|---|---|
| 3,880,444 | A | * | 4/1975 | Bridges | B62D 17/00 280/86.753 |
| 4,083,575 | A | * | 4/1978 | Smith | B60G 3/20 267/221 |
| 4,192,396 | A | * | 3/1980 | Austermann, Jr. | B60B 35/08 180/252 |
| 4,353,568 | A | * | 10/1982 | Boyce | B62D 7/22 280/268 |
| 4,754,991 | A | * | 7/1988 | Jordan | B60G 7/00 267/293 |
| 6,003,886 | A | * | 12/1999 | Kiesel | B60G 3/145 280/124.134 |
| 6,688,586 | B1 | * | 2/2004 | Moore | B60G 3/28 267/230 |
| 7,210,693 | B2 | * | 5/2007 | Ingalls | B62D 17/00 280/86.756 |
| 8,220,811 | B2 | * | 7/2012 | Shimada | B21D 7/08 280/124.134 |
| 8,333,015 | B2 | * | 12/2012 | Merrill | B60G 9/00 280/86.751 |
| 8,740,251 | B2 | * | 6/2014 | Batson | B64F 1/28 137/355.16 |
| 2008/0007022 | A1 | * | 1/2008 | Jones | B60G 3/10 280/124.13 |
| 2012/0043735 | A1 | * | 2/2012 | Grauer | B60G 7/001 280/124.134 |

\* cited by examiner

*Primary Examiner* — Laura Freedman
(74) *Attorney, Agent, or Firm* — Whitaker Chalk Swindle & Schwartz PLLC; Decker A. Cammack

(57) ABSTRACT

The suspension beam or beams of a truck having a shortened bed are modified by bending a distal end of the suspension beam to decrease the distance between a frame mount point and a wheel mount (ball joint) point. The reduction in distance increases the structural support of the suspension sufficiently to eliminate non-uniform tire wear in shortened wheelbase vehicles.

1 Claim, 7 Drawing Sheets

SYSTEM AND METHOD FOR IMPROVING STRUCTURAL WEAR ON A MOTOR VEHICLE

BACKGROUND OF THE INVENTION

1. Field of the Invention

This invention relates to systems and methods of modifying commercial vehicles for use in heavy towing and aircraft operations. Is been shown to be advantageous for certain commercial vehicles, for example (but not limited to) heavy duty pickup trucks, to shorten the overall body length of the vehicle to achieve a tighter turning radius limited-space working environments. To accomplish this, manufacturers, and aftermarket companies, have simply removed several inches to several feet of the frame supporting the vehicle, and shorten the drive shaft and other mechanical components, to achieve a working vehicle.

The present invention solves the problem of unanticipated wear on rotational and other high-wear components (such as tires, wheels, hubs, ball joints, and suspension) due to the reduction in weight of the original factory components, and the altered geometry created by the removal of several feet of length from the drive shaft, vehicle frame, and other structural components.

2. Background of the Invention and Description of Related Art

This invention relates primarily to shorten heavy-duty towing vehicles, commonly called "bobtail" trucks that are modified after factory production by major automobile manufacturers such as Ford, General Motors, RAM, and now Nissan. While this invention is primarily directed to creating a solution to the wear-and-tear on these aftermarket vehicles, the principles disclosed herein would apply to suspension modifications for any production vehicle that is shorten. Additionally, the concepts and principles disclosed herein could be used to correct potential suspension problems from lengthening vehicles.

The solution disclosed by the present invention was developed as a result of the inordinate wear of replaceable components of heavily modified flight line tow tractor (FLTT) vehicles. FLTT vehicles are design to be manufactured from production vehicles that have the rear chassis suspension/axles/wheels removed, and repositioned forward and reattached using original equipment manufacturer (OEM) techniques, with shorten frame rails.

By virtue of the repositioning of the suspension/axles/wheels, proper camber adjustment cannot be achieved. Camber is the measure of angle created by the wheels of the vehicle between a vertical line defined by the vehicle frame on flat ground, to the angle of the wheels relative to the vertical frame. A "positive camber" means that the wheels are angled inward, such that the distance between the top of the front tires is greater than the distance between the bottom of the front tires. Repositioned rear end of the modified vehicle reduced a sufficient amount of weight from the front suspension, as to create a situation in which the vehicle had insufficient weight on the front suspension the place the front tires and acceptable-wear situation. As a result, front tire wear on FLTT vehicles is unacceptable. For more than twelve years, multiple solutions have been proposed, none of which have been successful. These proposed solutions include the following.

The camber/caster adjustment of OEM vehicles includes an adjustment bushing that provides for a range of adjustment. In order to alleviate the problem of premature tire wear, the outfitters or other providers of bobtail FLTT vehicles positioned the caster camber adjustment to the higher limit of positive range, which exacerbated the problem.

Additionally, upon receipt of new vehicles, and identification of premature wear on tires, vehicle users have historically set the caster/camber setting to the lower limit on the negative caster scale. This modification also failed to alleviate the premature wear problem tires. Regardless, both users and outfitters agree that the adjustment range of the adjustment bushing does not alleviate the premature wear at any setting within the adjustment range.

Outfitters have also attempted to lengthen the I-beams of the front suspension, which decreases the pre-load camber angle.

A larger camber/caster bushing was installed as an additional attempt to provide a greater range of adjustment, and to alleviate the positive camber stress introduced by the shorten vehicle frame. The solution did not correct the problem, and indeed cause additional stress to the steering components and led to camber bushings failing and the failure of ball joints prematurely.

Another proposed solution was the use of higher quality tires with better tread patterns. This likewise did nothing to alleviate the problem of premature wear.

SUMMARY OF THE INVENTION

Based on the foregoing, an improved front suspension as needed. Front suspensions in accordance with this invention include at least one modified front suspension I-beam pair that creates the proper camber adjustment for vehicles with shortened frame and drive components.

Generally speaking, the I-beam is modified from the factory specification to shorten the distance between the ball joint at the wheel and the attachment point on the frame cross-member between the wheels. This solution seems counter-intuitive and yields an unexpected result; by shortening the total distance between the frame and the wheel, the general expectation (and the reason the positive camber was maximized as described above) was that the positive camber would be too great. The alternative result was achieved through the present invention. The inventor determined that by shortening the I-beam length, the weight distribution was more directly on the wheels and ball-joint, resulting in a camber angle that reduces wear on the tires and ball-joints, as well as the camber/caster bushings at the wheel suspension. The modification allows for adjustment to the caster/camber angles of FLTT vehicles, while still falling within the factory specifications for non-FLTT vehicles, which becomes of paramount importance when the FLTT vehicles are used for nuclear applications and/or require factory warranties to remain intact.

DETAILED DESCRIPTION OF THE INVENTION

In accordance with embodiments of the present invention, the I-beams of an independent front-suspension of a vehicle may be modified to prevent early and expensive wear of tires and other suspension components. The invention described herein is necessitated by vehicles that are modified from factory specifications by shortening the frame and drive train—typically in pickup trucks and other heavy duty vehicles. These vehicles are typically modified to achieve a shorter wheelbase to facilitate use in airports and at airfields.

Figure 1:
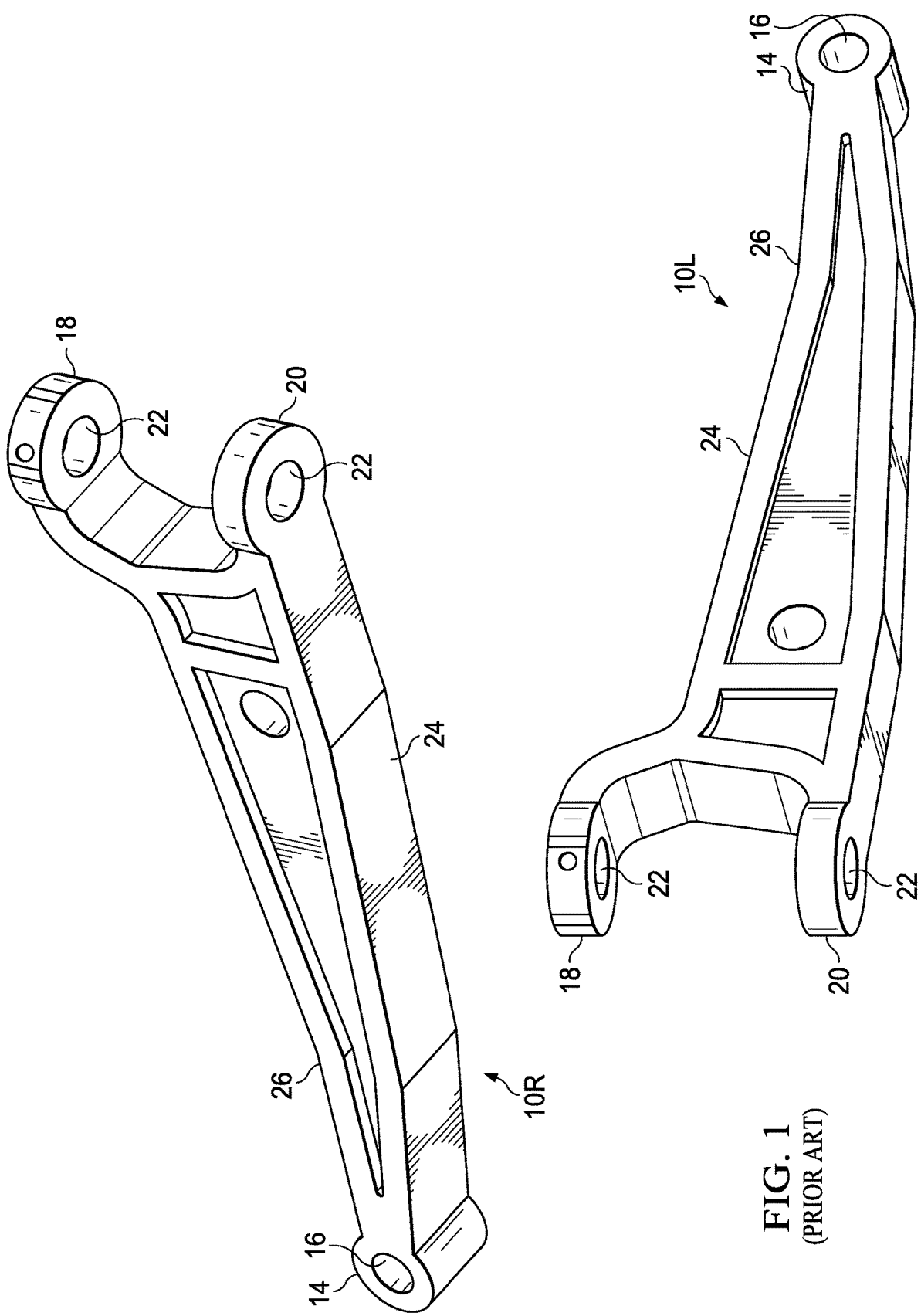
FIG. 1 is a representation of the I-beams of a heavy-duty vehicle front independent suspension, without modification.

FIGS. 1-4 show embodiments of the I-beams for the front suspension of a heavy-duty pickup truck, and attendant modifications in accordance with the present invention. FIG. 1 shows I-beam suspension members for one side of the front suspension of a Ford F-series heavy duty truck.

Figure 1A:
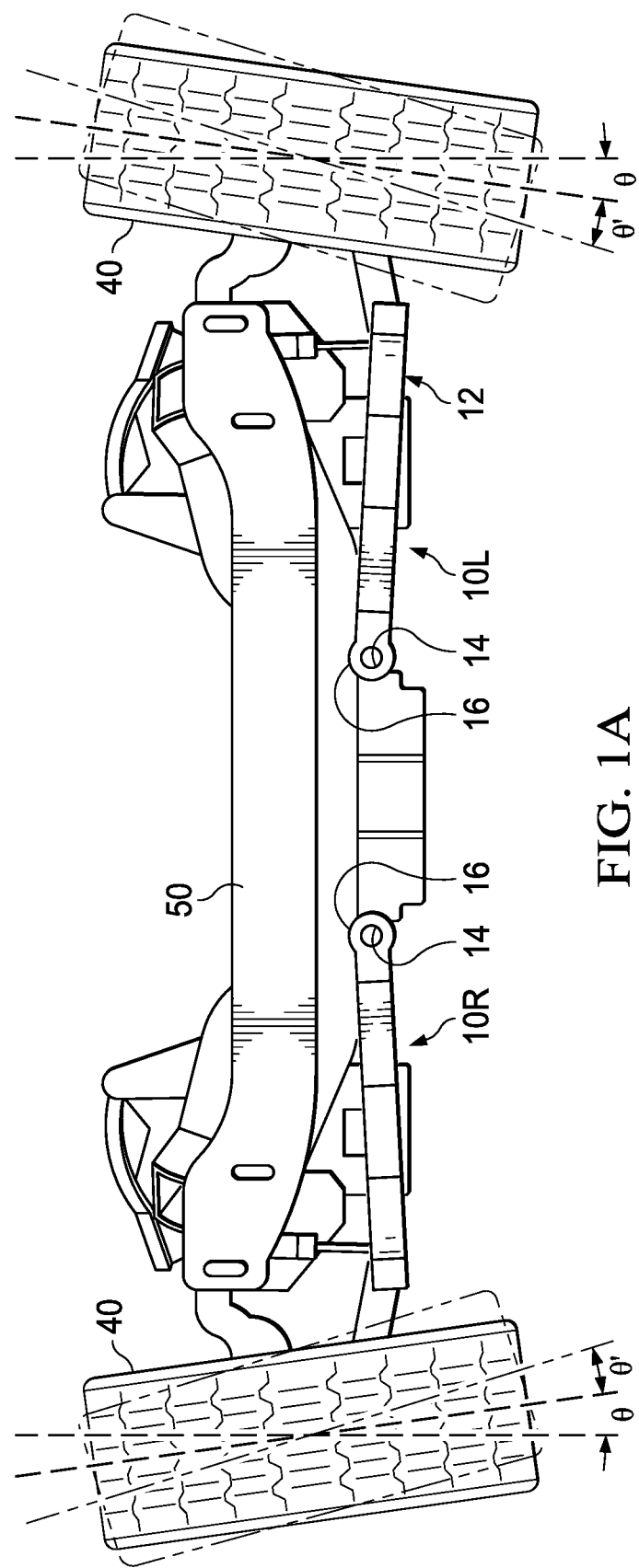
FIG. 1A is a front-view of the major components of the a front suspension system in accordance with embodiments of the invention.
Figure 1B:
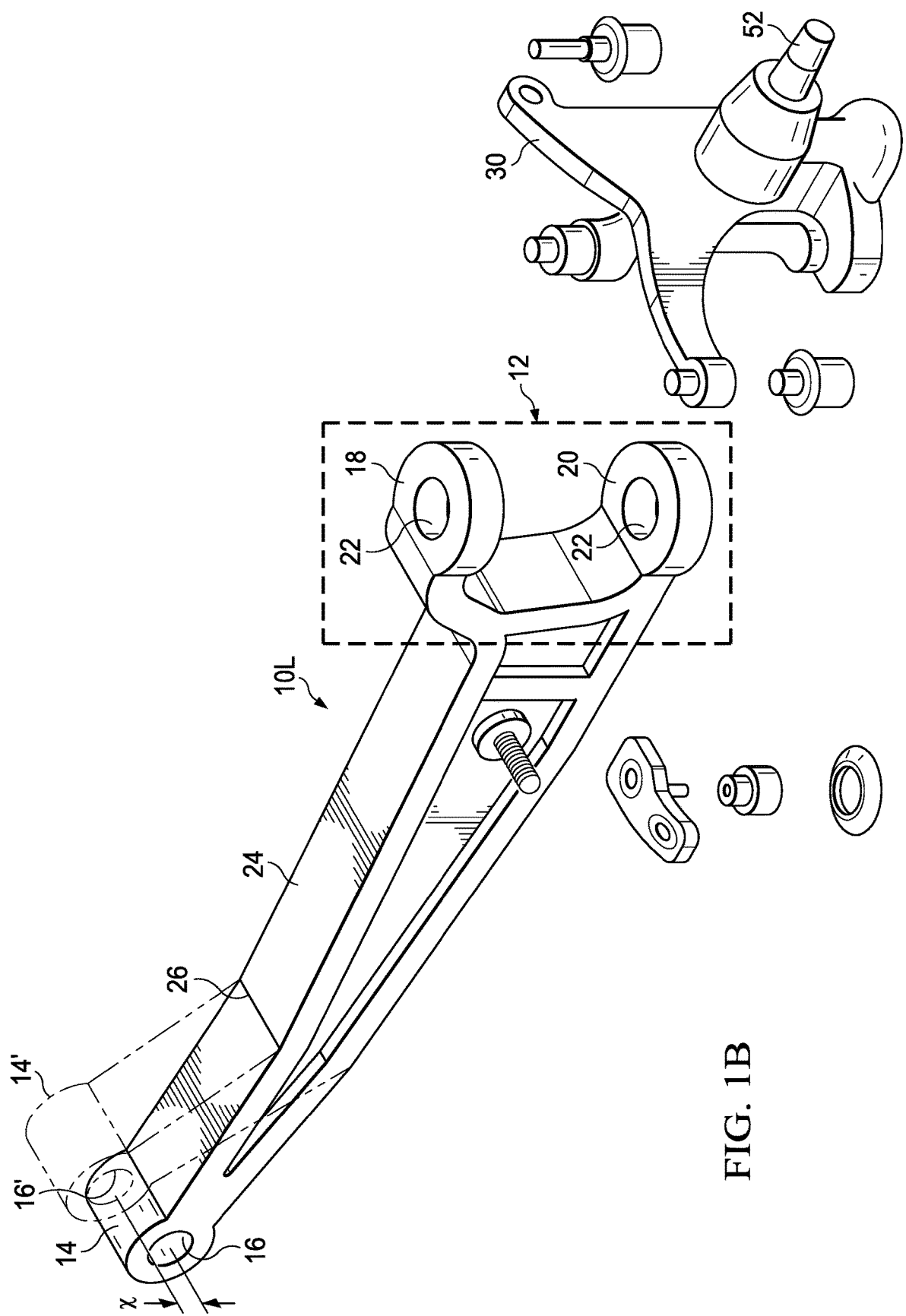
FIG. 1B is a representation of the left-side of an independent front suspension in accordance with embodiments of the present invention.

In FIG. 1A, suspension components are shown mounted to the relevant portions of the truck frame, as viewed from the front of the vehicle. While the present invention was tested on a Ford truck, one of ordinary skill in the art will understand that the principles of the invention shown herein may be applied to independent front suspensions of other vehicles without departing from the spirit and scope of the present invention. Additionally, the principles disclosed herein can be applied to straight-beam suspensions on heavy duty trucks manufactured by Chrysler/Dodge and others. The suspension includes left axle beam 10L and right axle beam 10R. Each of these lateral axle beams 10L and 10R has proximal and distal end. For purposes of this disclosure, the proximal end 12 mounts at the ball joint 30 (not shown in FIG. 1A), which in turn is connected to the wheel/tire assemblies 40 on either side of the vehicle. The distal end 14 of each I-beam 10L and 10R is located on the opposite end of the beams 10L and 10R. Each of these I-beams 10L and 10R attach to a frame cross member 50 using an axle pivot bolt disposed through a bushing inserted into an aperture 16 disposed through a mounting bracket (not shown) at the distal ends 14 of beams 10L and 10R.

Additionally, there may be a radius arm (not shown) on the left and right side of the frame that attaches to the ball joint 30 at the front and the frame rails on the left and right side behind the ball joint 30. The radius arm, if present, would be modified to provide adjustment and support of the frame and front suspension longitudinally with the frame, and may be adjusted for caster angle of the front left and right wheels.

As shown in FIG. 1, each of the I-beams 10L and 10R include a proximal end 12 and a distal end 14 as described above. Accordingly, a beam body 24 is disposed between the proximal end 12 and the distal end 14. The beams 10L and 10R may be machined, forged, or assembled, and may be manufactured of any suitable material, such as iron, steel, aluminum, titanium, or other materials as will be apparent to one of ordinary skill of the art. The proximal end may have one or more mounting surfaces 18, 20 which may also include a mounting aperture 22. The beams 10L and 10R may also have a structural bend 26 formed in the beam body 24.

Figure 3:
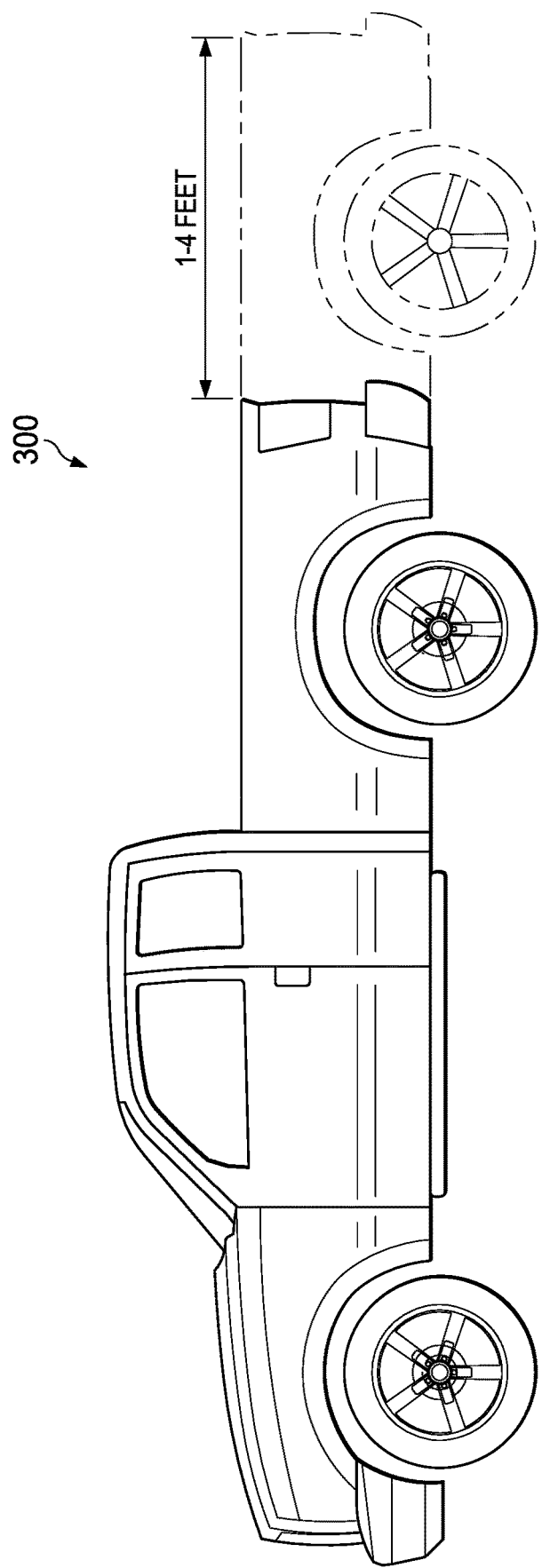
FIG. 3 is a side-view of a truck with a shortened bed in accordance with the present invention.
Figure 4:
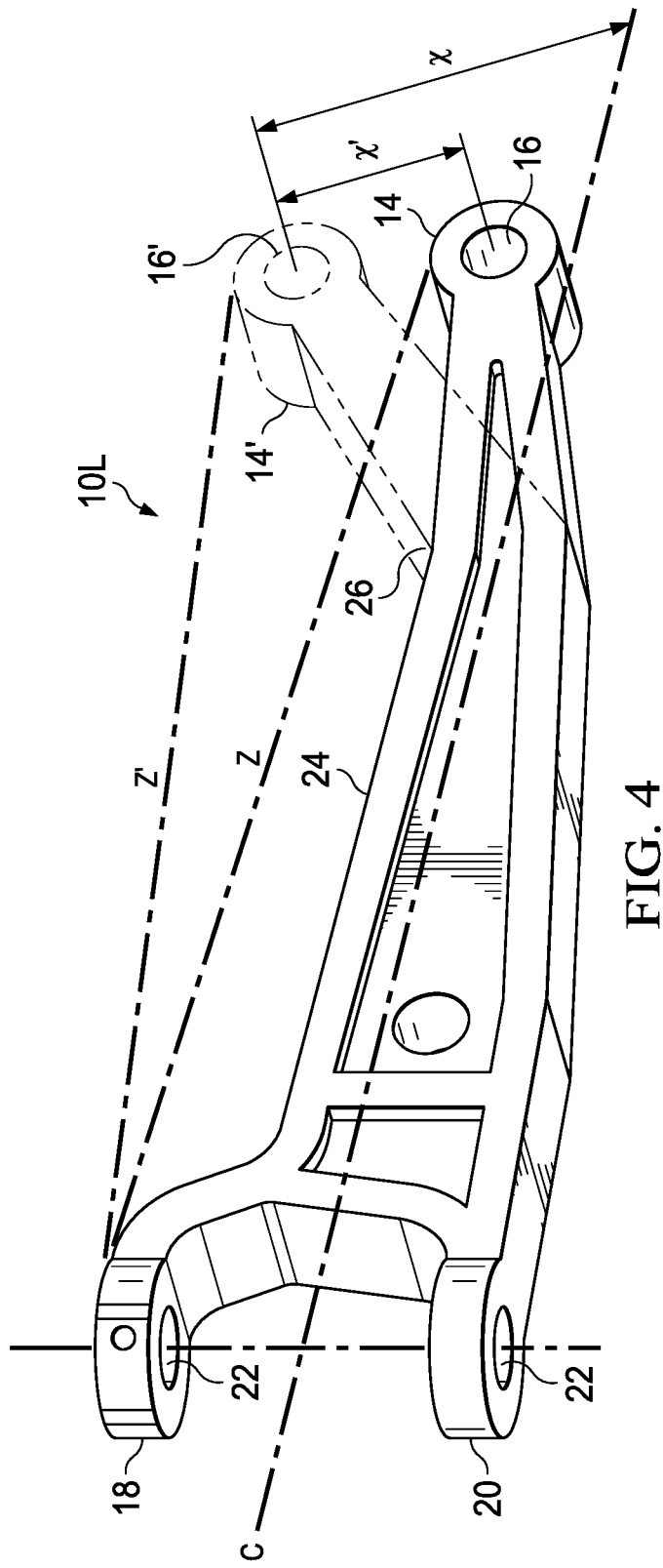
FIG. 4 is a listing of specification comparing the before and after camber adjustments for a Ford F350 modified in accordance with the present invention.

As shown in FIG. 3, in the modification of a standard truck to an FLTT, typically, one to four feet of the frame and drive shaft are removed to shorten the wheelbase of the vehicle. Prior to modification, the front suspension typically supports 70% of the weight of the vehicle, with the remaining 30% supported by the rear suspension. Upon shortening of the frame and drivetrain, the weight distribution shifts to approximately 75% front/25% rear.

The result of the shortening of the overall length leads to significant wear issues on the front suspension and tires. The wear is concentrated on the outer-third of the front tires and, on the ball joints that connect the beams 10L and 10R to the frame and wheel. Because of the reduction in overall weight of the vehicle by removing the frame portions and shortening the drivetrain, past solutions (as noted above) included lengthening the I-beams to force the resting vehicle into a more negative-camber state. This lengthening of the I-beams resulted in increased wear on the ball joint, without the benefit of significant reduction in tire wear. The next attempt to address the tire and ball joint wear was to install oversized cam bushing but tests revealed that the ball joint wore just as quickly, and did nothing to slow the uneven wear to the outer-third of the front tires. These, as well as the other attempts described herein to address the premature wear problem, were unsuccessful.

Figure 2:
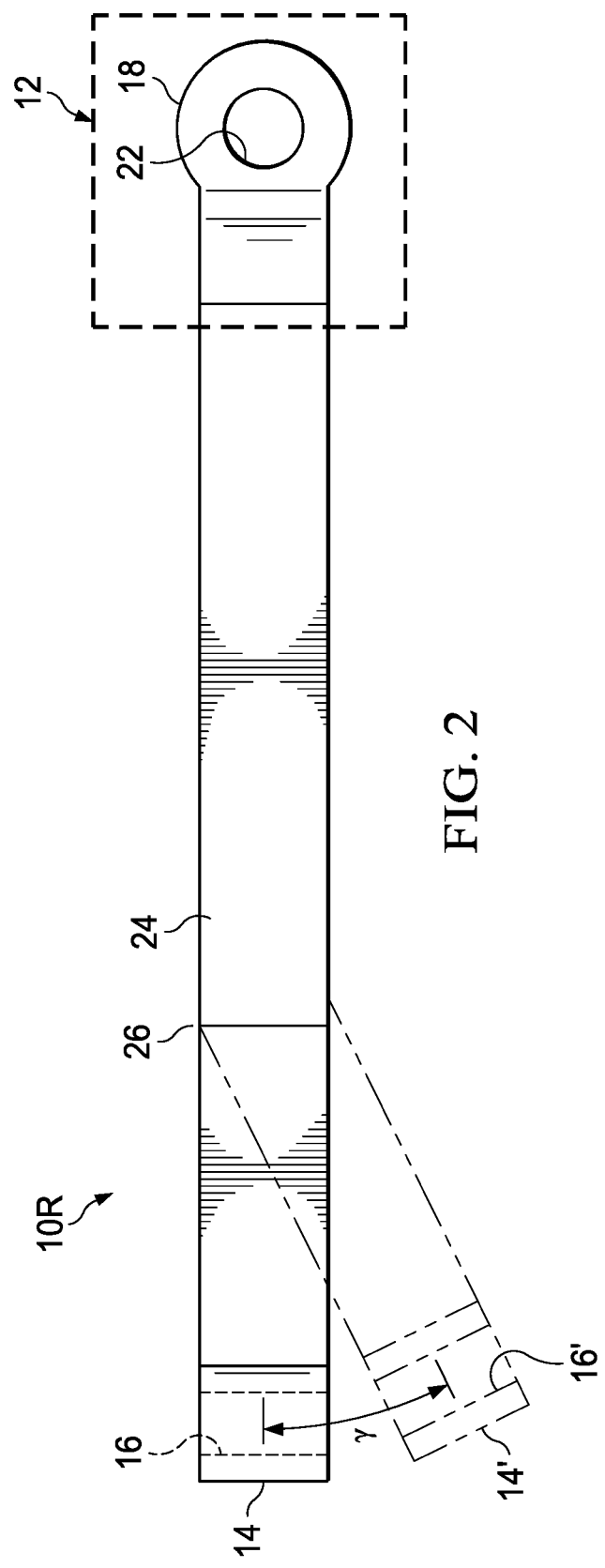
FIG. 2 is a plan view of a modified I-beam, including the direction of adjustment for both the longitudinal bend and the angle adjustment of the bushing-eye.

FIGS. 1B-4 show a solution to address the problems described above. The beams 10L and 10R are effectively shortened to reduce the distance between the ball joint 30 and frame 50, thereby increasing the camber angle of both the left and right front tires. By reducing the length of the beams 10L and 10R, the camber angle is increased. In a preferred embodiment shown in FIG. 4, the aperture 16 is moved upward from the centerline of the beam 10L in the direction of the existing bend 26, such that the resulting aperture 16' is approximately 1 mm-3 mm further from centerline c of the beam 10L, for the Ford heavy duty truck. By bending the beam body 24 at an existing bend 26, very little additional stress is applied to the beam 10L, such that the beam maintains its function throughout its intended range and conditions of use. While for existing Ford F350 axle beams which, for recent models measure approximately 763 mm (left) and 617 mm (right), beams manufactured in accordance with the present invention measure 762 mm (left) and 616 mm (right). This minimal reduction in overall length, surprisingly, increases the camber angle sufficiently to alleviate the wear on the outer-third of the tires of trucks outfitted with the modification and stress is relieved at the ball joint and wheel. Due to the increase of weight distribution to the front of a vehicle due to shortening the frame, the solution also provides additional support for the front suspension. Additionally, and for ease of installation, the axle beams 10L and 10R may be deflected toward the frame member 50 a distance y as shown in FIG. 2. This deflection, which may be between 0.05 and 0.15 mm, may assist in aligning the mounting aperture 16 with pre-existing mounting position holes on the frame member 50. The bends at 26 (both upward and deflection) may be performed using any suitable method, such as a vice, hydraulic press, or other suitable method. Similarly, the modified beams 10L and 10R may be manufactured by machining a replacement modified part from bar stock or through forging such that the resultant beam has the same deviations from a stock beam as described above through bending the member.

FIG. 1A shows a graphic representation (though not to scale) of the effect of the modified vehicle having a shortened length, including the modified beams 10L and 10R in accordance with the present invention. Upon mounting of the modified beams 10L and 10R as described above, the camber angle (angle from the vertical) is increased from 0 to 0'. The increased camber resulting from the modification as disclosed herein result in the reduced stress on the ball joints and uniform tire wear.

Figure 5:
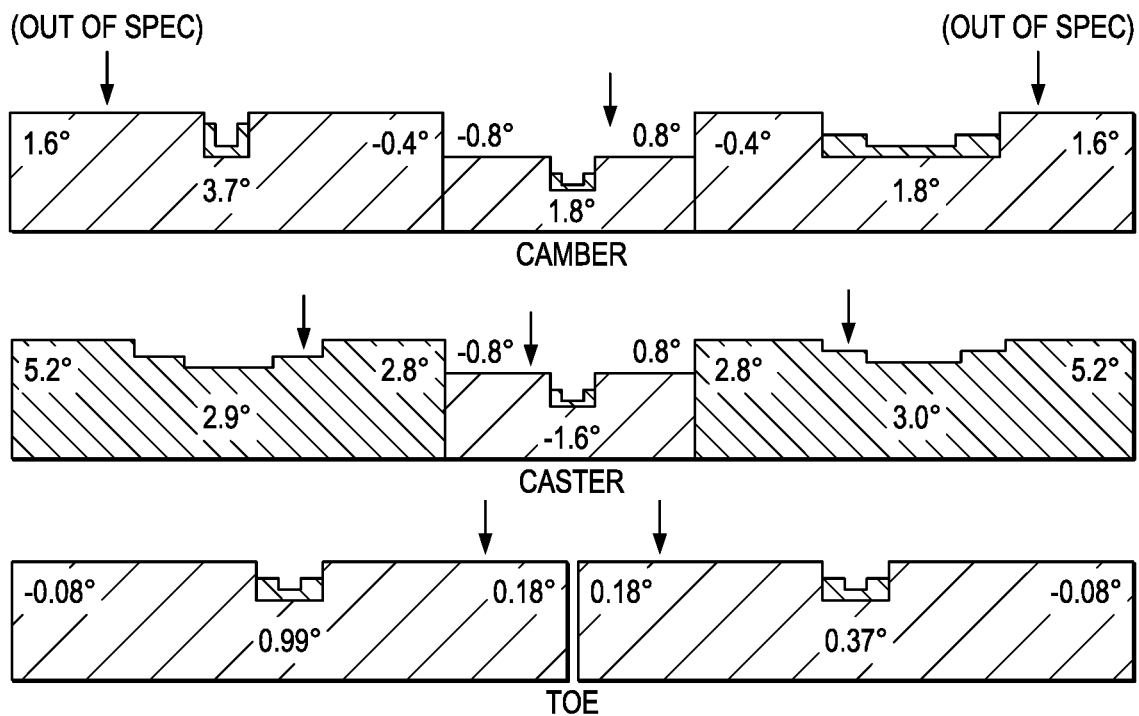
FIG. 5 is a representation of the caster and camber test results of a shortened vehicle without modification.
Figure 6:
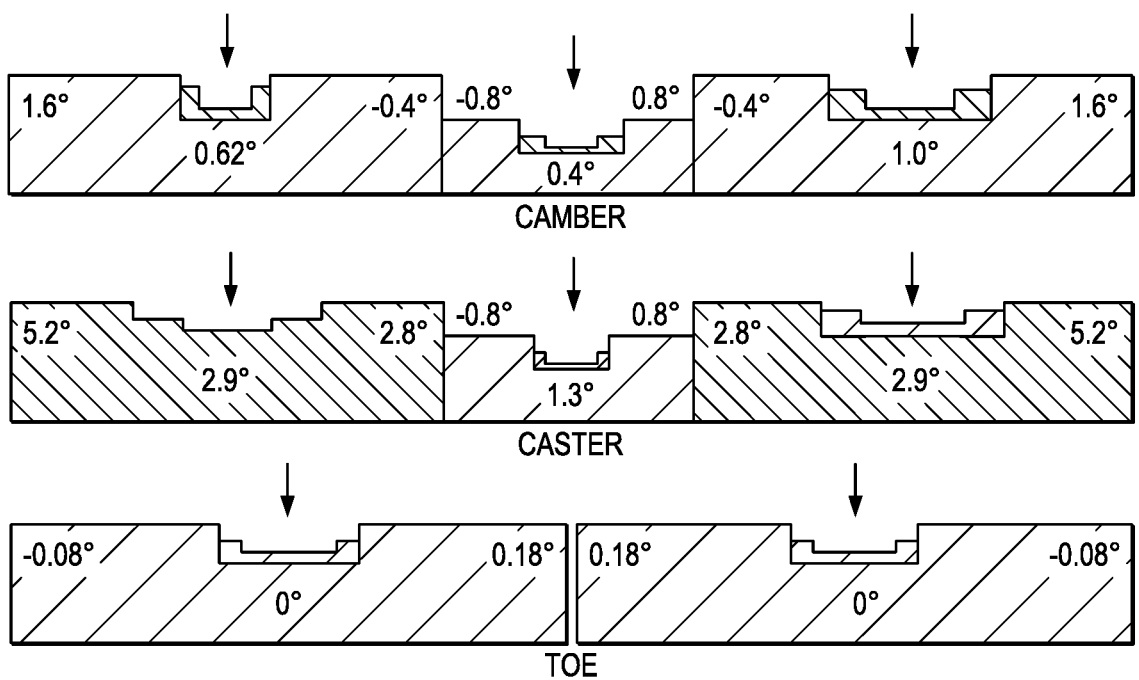
FIG. 6 is a representation of the caster and camber test results of a shortened vehicle with the modifications described in embodiments of the present invention.

FIGS. 5 and 6 show the test results of FLTT vehicles before and after the modifications discussed herein for a 2012 F350. The vehicle test results shown in FIGS. 5 and 6 are for a standard F350 vehicle with two rear tires. The center of each graph shows the proper camber, caster, and toe targets for the front and rear suspension of FLTT vehicles. FIG. 5 include arrows that show where the vehicles tested based on the shortened wheelbase without the modifications disclosed herein. FIG. 6 includes arrows that show the camber, caster, and toe of the FLTT vehicle after modification in accordance with the present invention. In FIG. 5, the original configuration results in a camber angle of approximately 1.8° (right) and 3.7° (left). And a caster of 2.9° and 3.0°, right and left, respectively. After modification, FIG. 6 shows the vehicles completely within manufacturers specification, for both camber and caster.

While the invention disclosed herein has been specifically discussed with respect to an independent suspension, the same principles may be applied to a solid beam suspension. In accordance with a solid or straight-beam suspension, whereby the ball joints are connected to one another via a single, unitary piece, deforming the straight beam in any direction sufficient to increase the camber of the left and right wheels would solve the problems created by a shortened vehicle bed.

This disclosure is intended to disclose the spirit and scope of the present inventions. Modifications, materials, and methods may be employed that would be apparent to one of ordinary skill in the art without departing from said spirit and scope.

What is claimed is:

1. A method of modifying a suspension of a motor vehicle having a shortened wheel base, the method comprising:
    bending a distal end of a lateral suspension member, the lateral suspension member comprising a proximal end opposite the distal end, the proximal end having a mounting joint configured for connection to a ball joint assembly at a front wheel, wherein bending the distal end of the lateral suspension member shortens the distance between the distal end of the lateral suspension member and the mounting joint, and wherein the shortened distance between the distal end of the lateral suspension member and the mounting joint increases the camber of the front wheel; and
    mounting the distal end of the lateral suspension member to a preexisting mounting bracket of a lateral frame member of the motor vehicle, and mounting the proximal end of the lateral suspension member to the ball joint assembly.

* * * * *